(12) United States Patent
Bartholoma et al.

(10) Patent No.: US 8,969,742 B2
(45) Date of Patent: Mar. 3, 2015

(54) CABLE FITTING HAVING A CLAMPING DEVICE FOR AN ARMOR OF THE CABLE

(75) Inventors: Mario Bartholoma, Winden (DE); Fritz Zugel, Waldkirch (DE); Volker Gotz, Kenzingen (DE); Achim Hoch, Waldkirch (DE)

(73) Assignee: Hummel AG, Denzlingen (DE)

( * ) Notice: Subject to any disclaimer, the term of this patent is extended or adjusted under 35 U.S.C. 154(b) by 172 days.

(21) Appl. No.: 13/638,221

(22) PCT Filed: Feb. 17, 2011

(86) PCT No.: PCT/EP2011/000764
§ 371 (c)(1),
(2), (4) Date: Sep. 28, 2012

(87) PCT Pub. No.: WO2011/120609
PCT Pub. Date: Oct. 6, 2011

(65) Prior Publication Data
US 2013/0020124 A1    Jan. 24, 2013

(30) Foreign Application Priority Data
Mar. 31, 2010 (DE) .................... 20 2010 004 425 U

(51) Int. Cl.
*H02G 3/18* (2006.01)
*H02G 3/06* (2006.01)
*H01R 13/56* (2006.01)

(52) U.S. Cl.
CPC ............ *H02G 3/0666* (2013.01); *H01R 13/565* (2013.01); *H02G 3/0675* (2013.01)
USPC ........... 174/654; 174/135; 174/667; 174/655; 248/56; 439/462

(58) Field of Classification Search
USPC ............... 174/650–656, 660, 667–669, 135; 385/135, 138; 439/462, 583, 584, 581; 16/2.1, 2.2
See application file for complete search history.

(56) References Cited

U.S. PATENT DOCUMENTS

| | | | |
|---|---|---|---|
| 6,809,263 B2 * | 10/2004 | Jackson ........................ | 174/651 |
| 7,282,650 B2 * | 10/2007 | Czuhanich et al. ........... | 174/659 |
| 7,408,122 B2 * | 8/2008 | Heimlicher et al. .......... | 174/653 |
| 7,781,685 B2 * | 8/2010 | Bartholoma et al. ......... | 174/654 |
| 2008/0236861 A1 | 10/2008 | Bartholoma et al. | |

FOREIGN PATENT DOCUMENTS

| | | |
|---|---|---|
| DE | 69218853 | 4/1997 |
| DE | 202005014138 | 12/2005 |
| EP | 0580288 | 1/1994 |
| GB | 2208335 | 3/1989 |
| GB | 2247996 | 3/1992 |

* cited by examiner

*Primary Examiner* — Dhirubhai R Patel
(74) *Attorney, Agent, or Firm* — Volpe and Koenig, P.C.

(57) ABSTRACT

A cable gland including a screw sleeve which can be inserted into a wall or a pipe coupling is provided. A union nut interacts with the screw sleeve, and a clamping insert is acted on by the union nut and is adapted to be pressed against a cable which is to be retained by tightening the union nut. The cable has a reinforcement and a clamping device for clamping a portion of the reinforcement is provided in the cable gland. The clamping device partially engages in the screw sleeve in an axial direction in a use position and is acted on by the union nut outside the screw sleeve. A portion of the clamping device engages in the screw sleeve and acts in an interlocking manner on an inner face of the screw sleeve in the rotation direction in the use position.

11 Claims, 5 Drawing Sheets

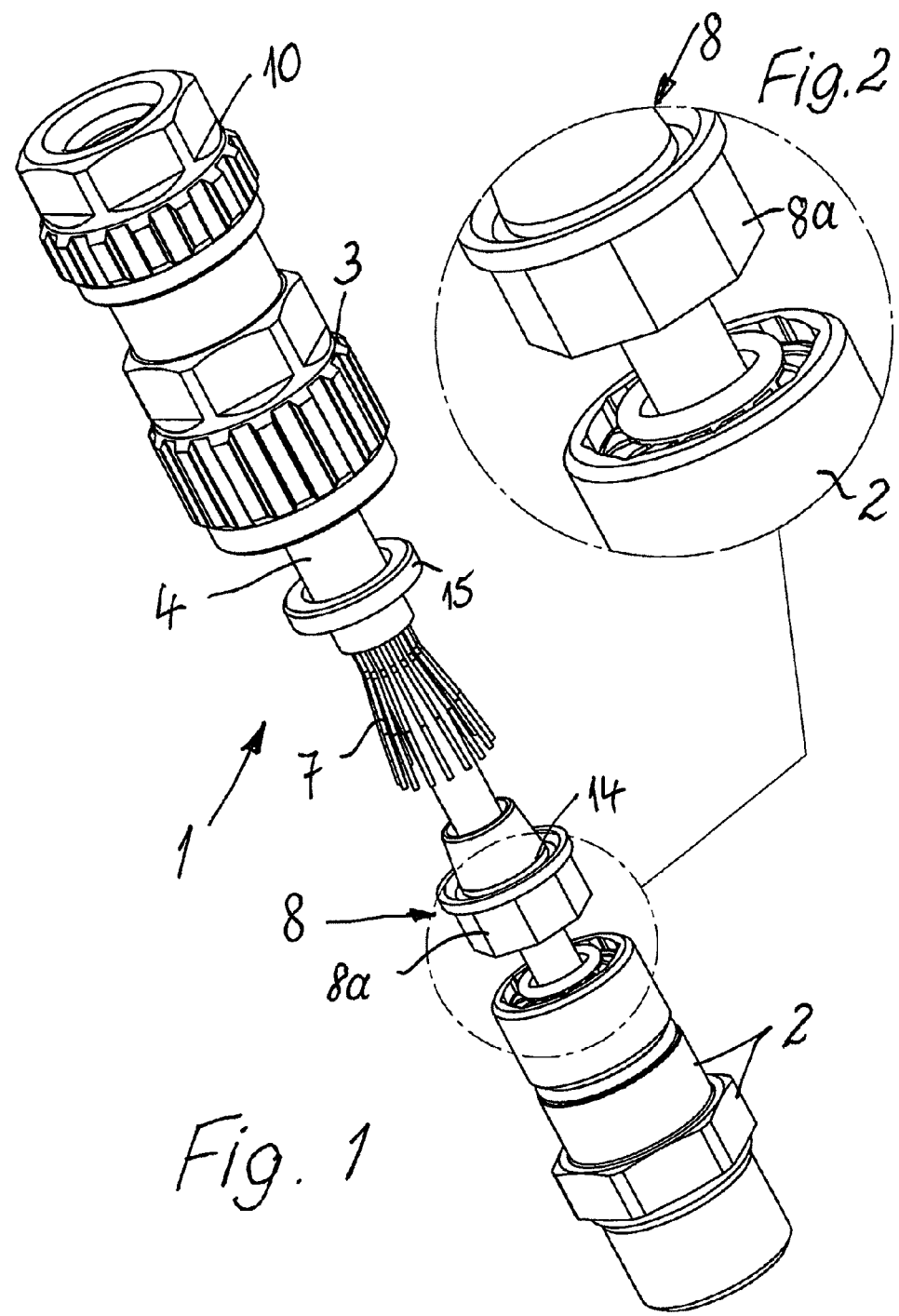

CABLE FITTING HAVING A CLAMPING DEVICE FOR AN ARMOR OF THE CABLE

BACKGROUND

The invention relates to a cable gland having a screw sleeve which can be inserted into a wall or a pipe coupling, having a union nut which interacts with said screw sleeve, having a clamping insert which is acted on by the union nut and can be pressed against a cable which is to be retained by tightening the union nut, wherein the cable has a reinforcement means and a clamping device for clamping a portion of the reinforcement means is provided in the cable gland, said clamping device partially engaging in the screw sleeve in the axial direction in the use position and being acted on by the union nut outside the screw sleeve.

A cable gland of this kind is known from DE 20 2005 014 138 U1 within a construction set and also from DE 692 18 853 T2. When the union nut is tightened, the cable and its reinforcement means can be carried along in the rotation direction in the process due to friction, and therefore connections of the cable within a housing can be damaged or destroyed. In order to solve this problem, pairs of tools which are intended to prevent twisting due to a high coefficient of friction have been proposed or provided in practice in the region of the clamping device. However, when powerful clamping forces are exerted on the clamping insert, it is nevertheless possible for the cable to be turned and twisted when the union nut is being tightened, primarily when the clamping insert is just beginning to take effect.

SUMMARY

The object is therefore that of providing a cable gland of the kind defined in the introductory part in which twisting of the cable while it is being clamped and while the reinforcement means of said cable is being clamped in can be avoided.

In order to achieve this object, the cable gland cited in the introductory part is characterized in that that portion of the clamping device which engages in the screw sleeve acts in an interlocking manner on the inner face of the screw sleeve in the rotation direction in the use position. This can prevent twisting of the clamping device or of the cable being clamped dependent on frictional forces and/or tool pairings. An interlocking connection in the rotation direction results, in any case, in a considerably higher torque against twisting than can occur on the cable when the union nut is tightened.

In this case, it is particularly expedient when the interlocking connection, which acts in the rotation direction, is formed as a sliding or clamping fit in the axial direction. The clamping device can therefore easily be pushed or inserted into the appropriate mating piece of the screw sleeve by way of its interlocking region, without additional measures for creating an interlocking connection in the rotation direction being required. In this case, these parts, which can be pushed together, could be provided with a conical design, but it is advantageous for production purposes and also for assembly purposes for those surfaces of the parts, which can be combined, which are matched in an interlocking manner in the rotation direction to be oriented parallel to the longitudinal center axis of the cable gland.

An expedient embodiment of the invention provides for the screw sleeve in the engagement region of the clamping device and this clamping device to have, as a mutual rotation-prevention means, a matching non-round cross section. Therefore, both the seat for the clamping device in the screw sleeve and the region thereof which fits in this seat can be of non-round design in order to prevent twisting of these parts in relation to one another.

The non-round cross section can be realized in various ways. By way of example, it can be, at the screw sleeve and at the clamping device, a cross section which is flattened in regions, but otherwise a circular cross section, an elliptical or oval cross section or a profiled cross section or a polygonal cross section or a cross section which has projections which are matched to one or more mating grooves, or a tongue-and-groove connection can be provided between the screw sleeve and the clamping device.

It is particularly expedient for the non-round cross section for the coupling, which is interlocking in the rotation direction and can be plug-connected in the axial direction, of the screw sleeve and of the clamping device to be a hexagon, a heptagon, an octagon or a decagon. Although a triangle, square or pentagon would be possible, the lower the wall thickness, primarily at the screw sleeve, the higher the number of edges of the non-round cross section. The external cross section of the screw sleeve can be correspondingly low in the region of this plug connection.

An expedient and advantageous refinement of the invention for improving fixing of the cable which belongs to the cable gland can involve that end face of the clamping device which is located in the screw sleeve in the use position acting on a second clamping insert which is arranged in the screw sleeve and/or a seal by means of an oblique surface in such a way that, when the clamping device is axially adjusted, the second clamping insert and/or the seal can be pressed against the cable, in particular against a region of the cable from which the insulation has been stripped. In addition to a first clamping insert which can preferably be pressed against the region of the cable from which insulation has not been stripped, a second clamping insert can therefore be acted on with the aid of the clamping device, and therefore the clamping device has a double function since it firstly grasps the reinforcement means of the cable and secondly can contribute to further improved clamping of the cable by means of a second clamping insert and/or a seal. In this case, the end face of the clamping device itself can have the corresponding oblique surface or the hollow cone or act on a pressure ring which is formed in such a way.

The clamping device can be in two parts and have a clamping body with a conical region which faces the union nut and have an axial clamping ring on this conical region, wherein, in the use position between the conical region and the clamping ring, parts of the reinforcement means, for example reinforcement wires or a reinforcement film or foil, are fixed or clamped in. The clamping device can therefore correspond approximately to those which are known from DE 20 2005 014 138 U1 and also from DE 692 18 853 T2, this relating to the actual clamping region.

A further refinement of the invention can, on the basis of DE 20 2005 014 138 U1, involve the union nut being divided and a first union nut serving to secure the clamping device, and the second union nut, which is arranged coaxially to said first union nut, serving to act on the first clamping insert and/or a seal, wherein the first union nut has an external thread which is averted from the internal thread region of said union nut, and the second union nut has an internal thread which matches said external thread. The first union nut can therefore have the usual internal thread for interacting with the external thread of the screw sleeve in its region which faces the screw sleeve, and, at a distance from said internal thread in the axial direction, have an external thread for the internal thread of the additional union nut to act on. Therefore, the design and manner of operation can correspond to the cable gland according to DE 20 2005 014 138 U1.

In this case, it is expedient for a projection from the first or the only union nut to act axially on the clamping device in the axial direction so as to produce a clamping effect, in particular on the pressure ring, in the use position, as is likewise known from DE 20 2005 014 138 U1 or from DE 692 18 853 T2. Tightening the union nut then not only produces the clamping action of the clamping device itself, but also acts axially on said clamping device in order to put into effect a clamping insert, which additionally interacts with it, on the cable.

An advantageous refinement and addition, in particular for securing the clamping device in the union nut by way of its non-round region, can involve the clamping device having, in its engagement region, a circumferential groove having a radially projecting, in particular elastic, retaining ring or O-ring, which engages in said circumferential groove, and the screw sleeve having, at its opening which faces the union nut, an undercut which engages over the retaining ring or O-ring in the use position, preferably with an axial spacing. This produces additional axial fixing of the clamping device, for example when the union nut is loosened, as a result of which the situation of the clamping device also being loosened can be avoided. Instead, said clamping device remains secured to the screw sleeve with the aid of the retaining ring when the union nut is loosened, wherein the retaining ring can also contribute to twisting prevention, depending on the dimensions. In this case, the undercut could possibly also be formed by an annular groove which is arranged on the inside of the screw sleeve and accommodates the radial projecting portion of the retaining ring or O-ring in the use position.

It is particularly expedient for the undercut to delimit the non-round insertion region of the screw sleeve. In the case of an arrangement of this kind, the non-round cross section of the screw sleeve is therefore delimited in the axial direction by an undercut, that is to say the axial dimension of the non-round region of the screw sleeve is shorter than the non-round region of the clamping body of the clamping device. When the clamping body and the screw sleeve are joined, the elastic retaining ring or O-ring can initially yield to a certain extent, until the non-round regions which are matched in an interlocking manner in the rotation direction have attained their use position, as a result of which the retaining ring or O-ring is then once again in the relaxed position in the axial direction behind the undercut in the screw sleeve and secures this plug connection of the clamping device and the screw sleeve in the axial direction.

Primarily, combining individual or several of the above-described features and measures results in a cable gland having a pressure piece on the clamping device, which pressure piece can be operated by a union nut, by means of which this pressure piece, which is in the form of a clamping ring, can firmly clamp the cable reinforcement means and at the same time can also axially secure the entire clamping device and possibly can press said clamping device against a clamping insert, wherein this clamping device is prevented, by an interlocking connection at its engagement point in the screw sleeve, from also rotating when one or two union nuts are tightened.

BRIEF DESCRIPTION OF THE DRAWINGS

In the text which follows, exemplary embodiments of the invention are described in greater detail with reference to the drawing, in which, in some cases schematically:

FIG. 1 shows a perspective view of a cable gland according to the invention in exploded form, that is shortly before it is assembled, wherein the reinforcement means of the cable which is partially stripped of insulation is not yet connected to the associated clamping device and this clamping device is not yet inserted into the associated screw sleeve by way of its polygonal region in a rotationally fixed manner, FIG. 2 shows, on an enlarged scale, the detail which is marked by the dash-dotted circle in FIG. 1 with the polygonal part of the clamping device before it is inserted into the screw sleeve.

DETAILED DESCRIPTION OF THE PREFERRED EMBODIMENTS

Figure 3:
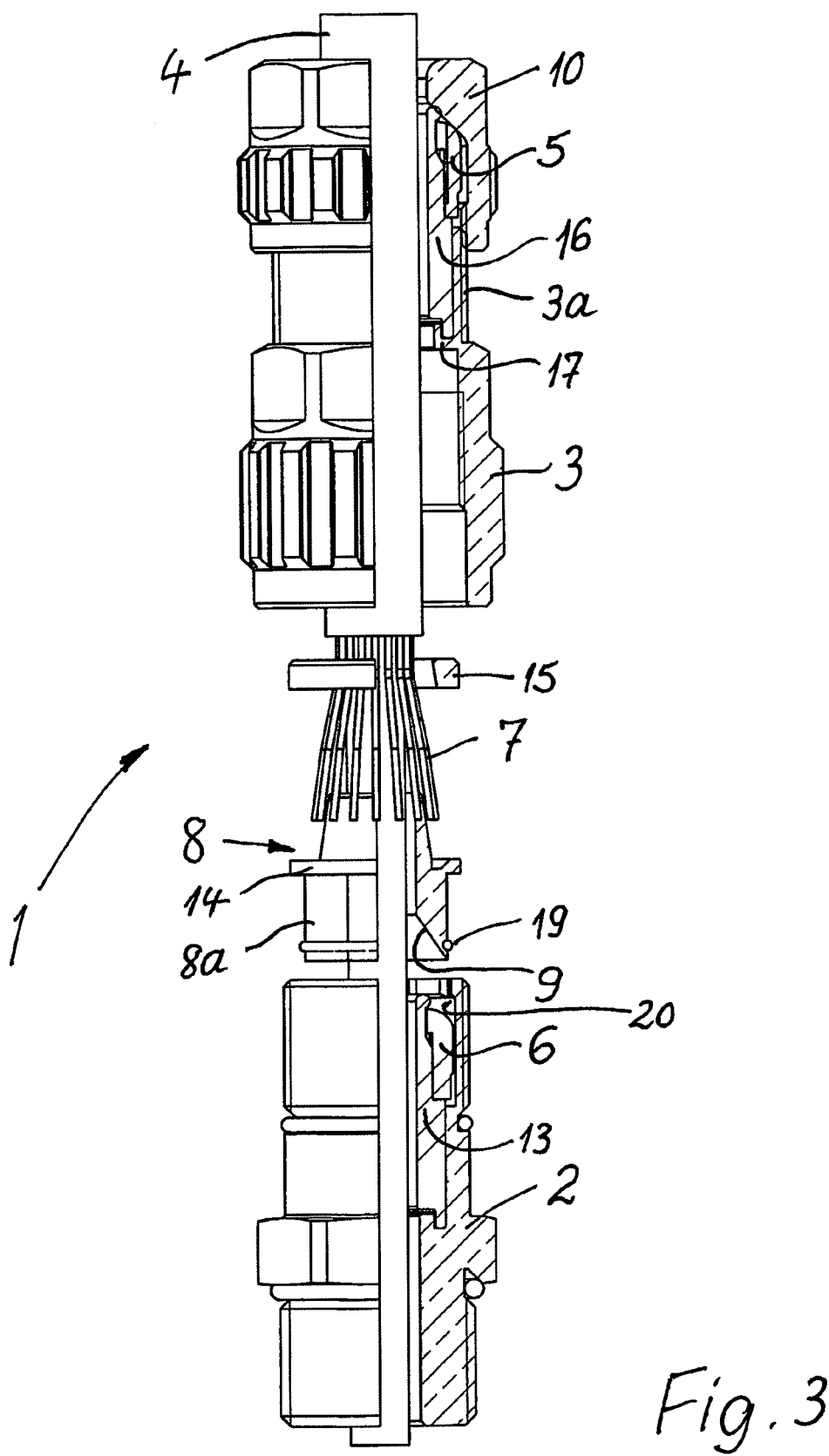
FIG. 3 shows, half in plan view and half in longitudinal section, the cable gland according to FIG. 1 before it is finally assembled, that is in an exploded illustration.

In the following description of the exemplary embodiments, parts which have corresponding functions are provided with corresponding reference numerals, even if their shape or design has been modified.

A cable gland, which is designated 1 overall, has a screw sleeve 2 which can be inserted into a wall or a pipe coupling or the like, at least one union nut 3 which interacts with said screw sleeve 2, and a first clamping insert 5 which is acted on by the union nut and can be pressed against a cable 4 which is to be retained by tightening the union nut 3, and also a second clamping insert 6, wherein the cable 4 has a reinforcement means 7, which is illustrated partially stripped of insulation in the figures, and a clamping device, which is designated 8 overall, for clamping a portion, which is stripped of insulation, of the reinforcement means 7, is provided within the cable gland 1. This clamping device 8 partially engages in that open end of the screw sleeve 2 which faces the union nut in the axial direction in the use position and is acted on by the union nut 3 outside the screw sleeve 2 in the axial and clamping direction.

Figure 5:
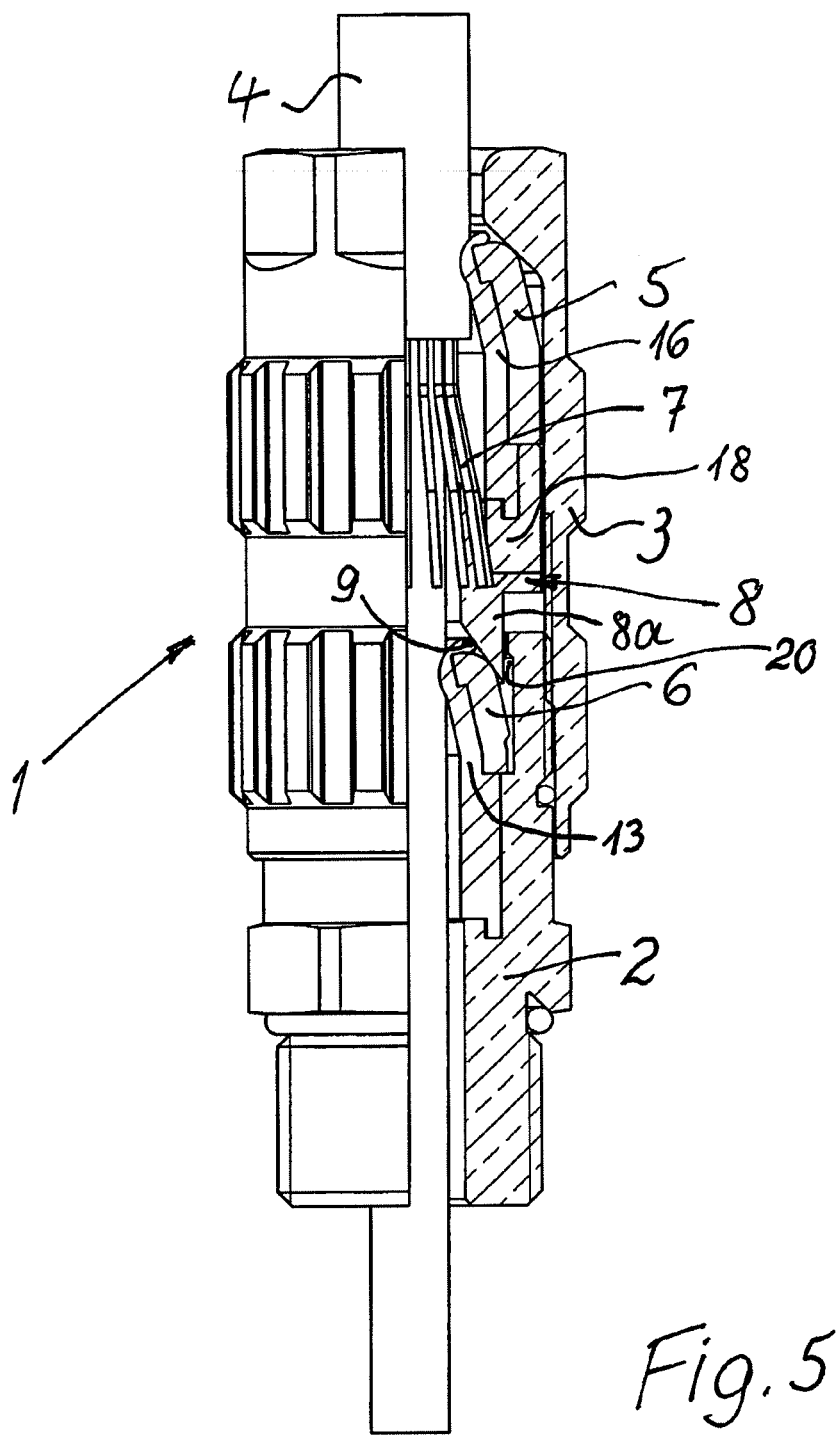
FIG. 5 shows an illustration which corresponds to FIG. 4 and in which a single union nut is provided for acting on both a clamping insert and the clamping device, said clamping device for its part, as in FIGS. 1 to 4, acting on a second clamping insert.

In this case, two clamping inserts of differing dimensions, specifically the larger first clamping insert 5 and the second, smaller clamping insert 6 which is still to be described are provided in the two exemplary embodiments, wherein the first, larger clamping insert 5 is acted on by a union nut 10 and the smaller, second clamping insert 6 is acted on by the union nut 3, while in the exemplary embodiment according to FIG. 5, a common union nut 3 acts on the screw sleeve 2 and both clamping inserts 5 and 6 are acted on and clamped when said union nut is tightened.

In order to ensure that the clamping device 8 cannot also rotate, and therefore to prevent the reinforcement means 7 and/or the cable 4 from also rotating, when the union nut 3 is operated, that portion 8a of the clamping device 8 which acts in the screw sleeve at the end face and the inner face of the screw sleeve 2 which is acted on by said portion in the use position are formed in such a way that an interlocking connection is established in the rotation direction in the assembled position.

Figure 4:
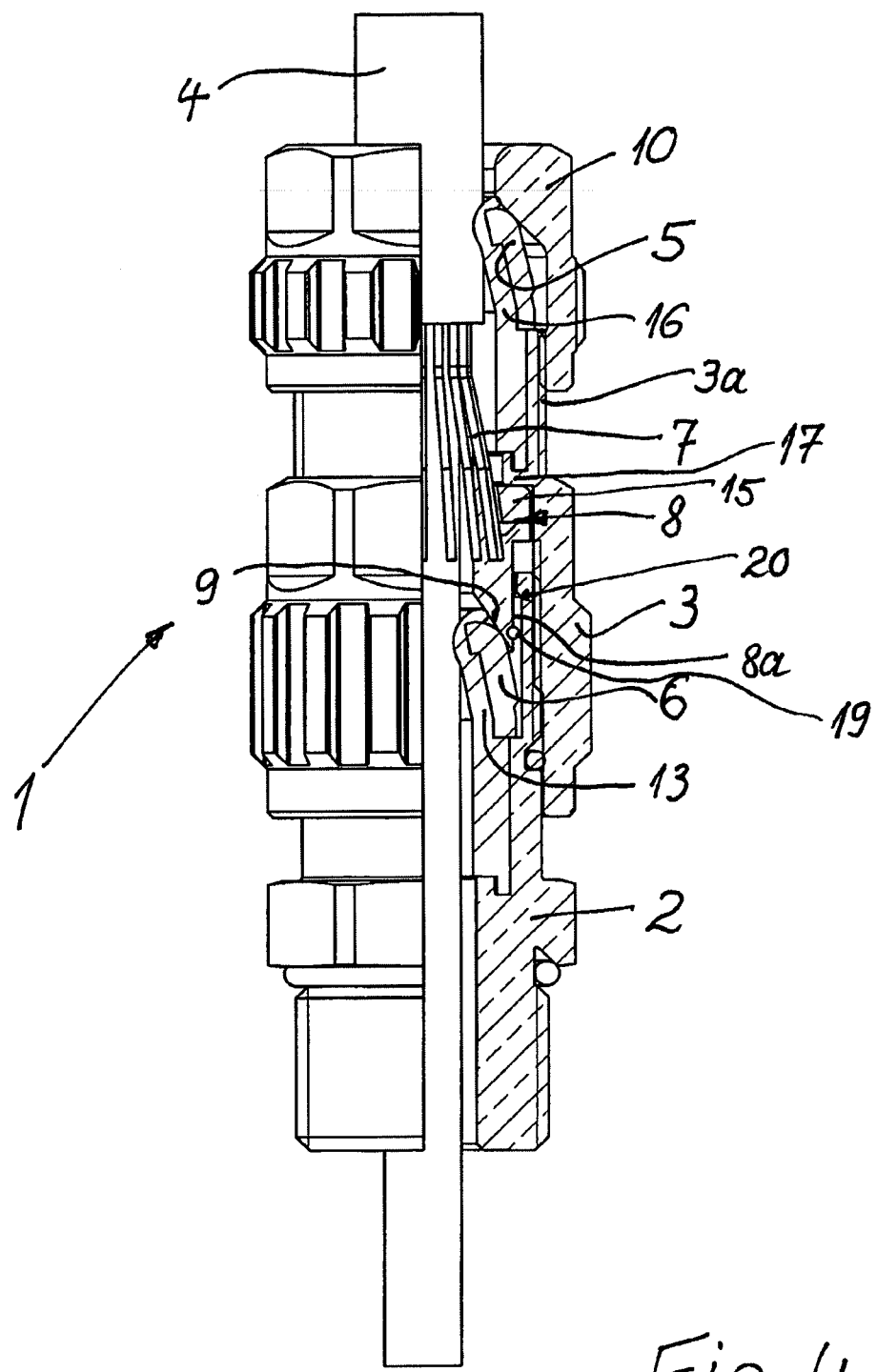
FIG. 4 shows, half in plan view and half in longitudinal section, the cable gland according to FIGS. 1 to 3 in the assembled position with the cable and its reinforcement means in the clamping position.

This interlocking connection which acts in the rotation direction, in contrast to in the axial direction, is in the form of a sliding fit, that is to say the clamping device 8 and, in particular, that portion 8a which engages in the screw sleeve 2 in the use position, can easily be pushed axially out of the position shown in FIGS. 1 and 2 into the position shown in FIGS. 4 and 5, in order to then no longer be able to twist relative to the screw sleeve 2.

In this case, FIGS. 1 and 2 and primarily also FIGS. 6 to 9 particularly clearly show that the screw sleeve 2 in the engagement region of the clamping device 8 and its portion 8a and this clamping device 8 itself on its portion 8a have, as a mutual rotation-prevention means, a matching non-round cross section.

Figure 7:
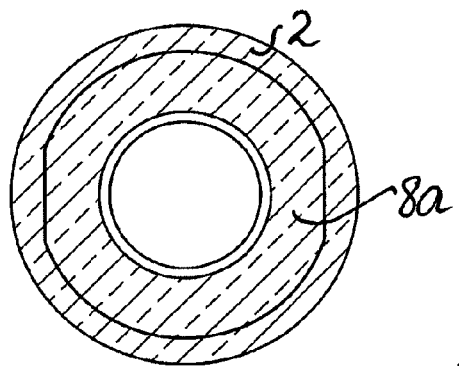
FIG. 7 shows an illustration which corresponds to FIG. 6, wherein a non-round cross section at that part of the clamping device which engages in the screw sleeve is formed by two flattened portions of an otherwise circular cross section.

In this case, FIG. 7 shows that the non-round cross section at the screw sleeve 2 and at the clamping device 8 can have a cross section which is flattened in regions, in the exemplary embodiment is flattened twice, but otherwise is circular.

Figure 8:
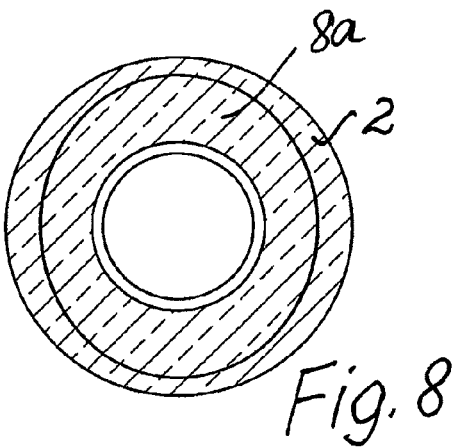
FIG. 8 shows an embodiment which corresponds to the illustration of FIGS. 6 and 7 and in which the non-round cross section is oval or elliptical.
Figure 9:
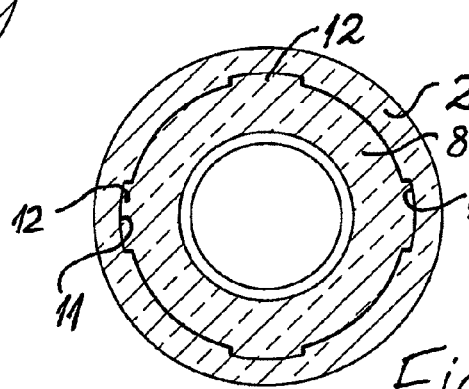
FIG. 9 shows an illustration which corresponds to FIGS. 6 to 8, wherein the non-round cross section is formed by projections, which are arranged radially on a circular cross section, and matching mating grooves.

FIG. 8 shows, as a non-round cross section between the screw sleeve 2 and the clamping device 8, an elliptical or oval cross section. In FIG. 9, the matching cross sections which are fixed in the rotation direction are profiled, wherein a cross section which matches mating grooves 11 in the screw sleeve 2 and has projections 12 is provided. Analogously, a tongue-and-groove connection could also be provided, but the illustrated cross sections have the advantage that no additional tongue part is required.

Figure 6:
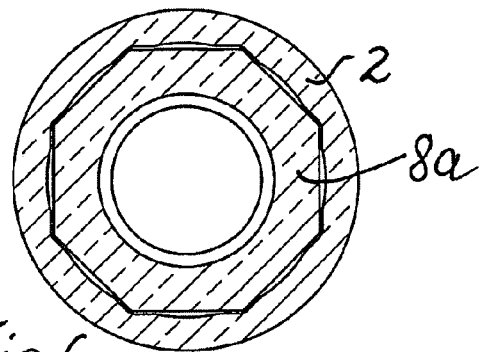
FIG. 6 shows a cross section through the cable gland in the region of the rotationally fixed engagement point of the clamping device in the screw sleeve, specifically without the cable, the clamping insert and the union nut being illustrated, wherein the clamping device has an octagonal cross section in its engagement region, said octagonal cross section being fitted in an interlocking manner in a corresponding hollow cross section of the screw sleeve.

FIG. 6 illustrates a preferred embodiment in which the non-round cross section for the coupling, which is interlocking in the rotation direction, of the screw sleeve 2 and the clamping device 8 or its portion 8a which engages in the screw sleeve 2 is an octagon, but could also be a hexagon, a heptagon or even a decagon. The greater the number of edges, the thinner the walls of the screw sleeve 2 can be in the region of this interlocking coupling, that is to say the smaller the external dimensions of the screw sleeve 2 can be in the coupling region.

If appropriate, so many edges or a profiling of this kind could also engage such that a tooth system could be produced.

In the two exemplary embodiments, provision is made for that end face of the clamping device 8 which is located in the screw sleeve 2 in the use position, or of that portion 8a of the clamping device 8 which engages in the screw sleeve 2 to act on the second clamping insert 6, which is arranged in the screw sleeve 2, and a seal 13 in such a way that, when the clamping device 8 is axially adjusted by the union nut 3, the second clamping insert 6 and the seal 13 can be pressed, and according to FIGS. 4 and 5 is pressed, against the cable 4 in a region from which the insulation has been stripped. It should be noted that the cable gland 1 could, however, also function in an analogous manner if the second clamping insert 6 and/or a seal 13 were not present. The only important factor is that the clamping device 8 finds an abutment in the axial direction so that it can perform its clamping function, wherein the second clamping insert 6 is said abutment in the exemplary embodiments.

It can be seen, primarily in FIGS. 1 and 3 but also when looking at FIGS. 4 and 5 together, that the clamping device 8 is in two parts and has a clamping body 14 which has the portion 8a and has a conical region which faces the union nut 3 and has a clamping ring 15 which can be axially adjusted to this conical region of the clamping body 14 and has an internal cone, as is known from DE 20 2005 014 138 U1. In this case, portions of the reinforcement means 7, for example reinforcement wires or possibly even a reinforcement film or foil, are fixed or clamped in between the conical region and the clamping ring 15 when the cable gland 1 is assembled in the use position. In a manner known from DE 20 2005 014 138 U1 the clamping device 8 is acted on and the clamping ring 15 is pressed against the conical region of the clamping body 14 by virtue of the union nut 3 being tightened, as a result of which contact is made with the reinforcement wires situated between said clamping ring and conical region and said reinforcement wires are secured. At the same time, the clamping device 8 is secured in the axial direction and pressed against the second clamping insert 6, so that the oblique or conical end face 9 of the portion 8a presses the clamping insert 6 radially inward against the cable 4 in the manner illustrated in FIGS. 4 and 5.

In the exemplary embodiment according to FIGS. 1 to 4, the union nut is divided and the first union nut 3, which is situated closer to the screw sleeve 2 in the use position, serves to secure the clamping device 8, while the second union nut 10, which is arranged coaxially to said first union nut, serves to act on the first clamping insert 5 and a seal 16 which is located there. In this case, the first union nut 3 has an internal thread in its region which engages over the union nut 2 and which matches the external thread of the screw sleeve 2, while it also has an external thread 3a on its opposite end region, an internal thread of the second union nut 10 matching said external thread, so that the two union nuts 3 and 10 can be screwed together in the manner illustrated in FIG. 4 in order to exert their respective action.

In this case, in the exemplary embodiment according of FIGS. 1 to 4, the first union nut 3 has a pressure ring 17 which is integrally connected to said union nut and acts in the axial direction so as to produce the clamping action.

In the exemplary embodiment according to FIG. 5, however, a separate pressure ring 18 is provided, said pressure ring being axially acted on by the common union nut 3 by means of the clamping insert 5, in order to operate the clamping device 8.

In this case, FIGS. 3 and 4 illustrate a way of securing the clamping device 8 in the axial direction in its use position, so that it cannot unintentionally fall out of the screw sleeve 2 again when the union nut 3 is loosened. To this end, provision is made for the clamping device 8 to have, in its engagement region, a circumferential groove having a radially projecting, preferably elastic, retaining ring or O-ring 19, which engages in said circumferential groove, and the screw sleeve 2 having, at its opening which faces the union nut 3, an undercut 20 which engages over the retaining ring or O-ring 19 in the use position according to FIG. 4 with an axial spacing. In this case, the undercut 20 is formed by a widening in the cross section being provided in the axial direction adjacent to the non-round region of the union nut 3, said widening being somewhat recessed in relation to the non-round cross section of the screw sleeve 2 in the radial direction. The undercut 20 therefore delimits the non-round insertion region of the screw sleeve 3 on the inside, and therefore the retaining ring or O-ring 19 assumes its position in which it is relaxed in the radial direction behind said undercut 20 in the insertion direction, as is illustrated in FIG. 4.

The illustrations according to FIGS. 1 and 5 show that the cable gland can, however, also be designed without a retaining ring or O-ring 19 of this kind.

The cable gland 1 has a screw sleeve 2 which can be inserted into a wall or a pipe coupling and has an external thread, and has a union nut 3 which interacts with said external thread of the screw sleeve 2. The union nut 3 can be used, by virtue of being tightened, to press a clamping insert 5 against a cable 4 which is to be retained, wherein the cable 4 has a reinforcement means 7 which is exposed at least at points or is free within the cable gland 1. A clamping device 8 for clamping a portion of this reinforcement means 7 is provided in the cable gland 1, said clamping device 8 partially engaging in the inner opening in the screw sleeve 2 in the axial direction in the use position and being directly or indirectly acted on by the union nut 3 outside the screw sleeve 2. In order to prevent twisting of the cable 4 and/or the clamping device 8 when the union nut 3 is tightened, that portion 8a of the clamping device 8 which engages in the screw sleeve 2 is secured in an interlocking manner on the inner face of the screw sleeve 2 in the rotation direction in the use position and has, for example, a polygonal cross section. In this case, the clamping device 8 can, by way of its end face 9 which engages in the screw sleeve 2, act on a second clamping insert 6.

The invention claimed is:

1. A cable gland (1) comprising: a screw sleeve (2) which is insertable into a wall or a pipe coupling, a union nut (3) which interacts with said screw sleeve (2), the screw sleeve (2) including an opening which faces the union nut (3), a clamping insert (5, 6) which is acted on by the union nut (3) and is adapted to be pressed against a cable (4) which is to be retained by tightening the union nut (3), wherein the cable (4) has a reinforcement (7), and a clamping device (8) for clamping a portion of the reinforcement (7) is provided in the cable gland (1), said clamping device (8) partially engaging in the screw sleeve (2) in an axial direction in a use position and being acted on by the union nut (3) outside the screw sleeve (2), and an engagement portion (8a) of the clamping device (8) which engages in the screw sleeve (2) at an engagement region of the screw sleeve (2) acts in an interlocking connection on an inner face of the screw sleeve (2) in a rotation direction in the use position, wherein the screw sleeve (2) in the engagement region and the clamping device (8) in the engagement portion (8a) have matching non-round cross sections, and the clamping device (8) has, in the engagement portion (8a), a circumferential groove having a radially projecting retaining ring or O-ring (19), which engages in said circumferential groove, and the screw sleeve (2) has, at the opening facing the union nut (3), an undercut (20) which engages over the retaining ring or O-ring (19) in the use position.

2. The cable gland as claimed in claim 1, wherein the interlocking connection, which acts in the rotation direction, between the clamping device (8) and the screw sleeve (2) is provided with a sliding or clamping fit in the axial direction.

3. The cable gland as claimed in claim 1, wherein the non-round cross sections are flattened in regions, but otherwise have a circular cross section, an elliptical or oval cross section or a profiled cross section or a polygonal cross section or a cross section which has projections (12) which are matched to one or more mating grooves (11), or a tongue-and-groove connection is provided between the screw sleeve (2) and the clamping device (8).

4. The cable gland as claimed in claim 1, wherein the non-round cross sections for the coupling, which are interlocking in the rotation direction, of the screw sleeve (2) and of the clamping device (8) are a hexagon, a heptagon, an octagon, or a decagon.

5. The cable gland as claimed in claim 1, wherein an end face (9) of the clamping device (8) which is located in the screw sleeve (2) in the use position acts on at least one of a second clamping insert (6) which is arranged in the screw sleeve (2) or a seal (13) by an oblique surface in such a way that, when the clamping device (8) is axially adjusted, the at least one of second clamping insert (6) or the seal (13) is pressed against the cable.

6. The cable gland as claimed in claim 1, wherein the clamping device (8) is in two parts and has a clamping body (14) with a conical region which faces the union nut (3) and has a clamping ring (15) which is axially adjustable on the conical region, and in the use position between the conical region and the clamping ring (15), parts of the reinforcement (7) are adapted to be fixed or clamped in.

7. The cable gland as claimed in claim 1, wherein the union nut is divided and a first union nut (3) serves to secure the clamping device (8), and a second union nut (10), which is arranged coaxially to said first union nut, serves to act on at least one of the first clamping insert (5) or a seal (16), and the first union nut (3) has an external thread (3a), and the second union nut (10) has an internal thread which matches said external thread.

8. The cable gland as claimed in claim 7, wherein a projection (17) from the first or only union nut (3) acts axially on the clamping device (8) in the axial direction so as to produce a clamping effect in the use position.

9. The cable gland as claimed in claim 1, wherein the retaining ring or O-ring (19) is elastic.

10. The cable gland as claimed in claim 9, wherein the undercut (20) engages over the retaining ring or O-ring (19) in the use position with an axial spacing.

11. The cable gland as claimed in claim 1, wherein the undercut (20) delimits the non-round insertion region of the screw sleeve (2) in the axial direction.

* * * * *